(12) United States Patent
Mo et al.

(10) Patent No.: US 9,032,115 B2
(45) Date of Patent: May 12, 2015

(54) METHOD AND DEVICE FOR PASSING PARAMETERS BETWEEN PROCESSORS

(75) Inventors: Zhiwei Mo, Shenzhen (CN); Ning Chen, Shenzhen (CN); Hao Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 29 days.

(21) Appl. No.: 14/006,030

(22) PCT Filed: May 31, 2011

(86) PCT No.: PCT/CN2011/074947
§ 371 (c)(1),
(2), (4) Date: Dec. 2, 2013

(87) PCT Pub. No.: WO2012/126203
PCT Pub. Date: Sep. 27, 2012

(65) Prior Publication Data
US 2014/0095829 A1  Apr. 3, 2014

(30) Foreign Application Priority Data
Mar. 21, 2011 (CN) .......................... 2011 1 0068123

(51) Int. Cl.
*G06F 13/28* (2006.01)
*G06F 15/76* (2006.01)
(Continued)

(52) U.S. Cl.
CPC .............. *G06F 9/3877* (2013.01); *H04L 67/10* (2013.01); *G06F 9/546* (2013.01);
(Continued)

(58) Field of Classification Search
CPC ........ H04W 4/02; H04W 4/023; H04L 67/10; G06F 9/546
See application file for complete search history.

(56) References Cited

U.S. PATENT DOCUMENTS 6,279,151 B1    8/2001 Breslau
6,851,108 B1 *  2/2005 Syme et al. ................... 717/146
(Continued)

FOREIGN PATENT DOCUMENTS

CN    101187881 A    5/2008
CN    101668283 A    3/2010

OTHER PUBLICATIONS

International Search Report in international application No. PCT/CN2011/074947, mailed on Dec. 15, 2011.
(Continued)

*Primary Examiner* — Hyun Nam
(74) *Attorney, Agent, or Firm* — Oppedahl Patent Law Firm LLC

(57) ABSTRACT

The disclosure provides a method for passing a parameter between processors. The method comprises the following steps: in a source program of a slave processor, directly introducing a static configuration parameter to be passed; obtaining a relative address of the static configuration parameter when converting the source program of the slave processor into a target program of the slave processor; and configuring directly, by a master processor, a parameter value of the static configuration parameter in the target program of the slave processor according to the obtained relative address of the static configuration parameter. The disclosure also provides a system for passing a parameter between processors. The system has no need to use external hardware such as a dual-port Random Access Memory (RAM) and a register, thus, the requirement of parameter transmission on the external hardware is reduced, and further the area and static power consumption of a chip are reduced. The disclosure reduces the cycle delay of the slave processor in accessing the dual-port RAM and the register, thereby effectively reducing the dynamic power consumption of the chip, improving the processing capability of the slave processor and enhancing the effective performance of the slave processor.

12 Claims, 3 Drawing Sheets

(51) Int. Cl.
*G06F 9/38* (2006.01)
*H04L 29/08* (2006.01)
*G06F 9/54* (2006.01)
*G06F 13/16* (2006.01)
*G06F 15/167* (2006.01)
*G06F 9/44* (2006.01)
*G06F 9/445* (2006.01)

(52) U.S. Cl.
CPC ......... *G06F 13/1668* (2013.01); *G06F 15/167* (2013.01); *G06F 8/00* (2013.01); *G06F 9/3881* (2013.01); *G06F 9/44505* (2013.01); *Y02B 60/185* (2013.01)

(56) References Cited

U.S. PATENT DOCUMENTS

2003/0182465 A1* 9/2003 Moir et al. .................. 709/314
2013/0159999 A1* 6/2013 Chiueh et al. ..................... 718/1

OTHER PUBLICATIONS

English Translation of the Written Opinion of the International Search Authority in international application No. PCT/CN2011/074947, mailed on Dec. 15, 2011.

* cited by examiner

METHOD AND DEVICE FOR PASSING PARAMETERS BETWEEN PROCESSORS

TECHNICAL FIELD

The disclosure relates to a communication base-band technology, and in particular to a method and device for passing a parameter between processors.

BACKGROUND

With the advent of 4G times, wireless communication networks such as 2G, 3G, Wireless Fidelity (WiFi) and the like would not disappear immediately or exit a market; instead, they would coexist for a very long time. The vigorous development of the wireless communication technology triggers the tendency of network heterogeneity; and various wireless technologies emerge in endlessly to provide extensive and heterogeneous network environments for users, including a wireless personal area network such as Zigbee and Bluetooth, a wireless local area network such as WiFi, a wireless metropolitan area network such as 802.16 Worldwide Interoperability for Microwave Access (WiMAX), a wireless mobile wide area network such as 2G and 3G, a satellite network, a point-to-point (Ad Hoc) network, a wireless sensor network, and so on. In order to satisfy requirements of a user on roaming and to make full use of various heterogeneous network resources, a terminal technology must develop towards multimode and intelligentization. It is an irreversible tendency for terminals to evolve towards the direction of supporting cognitive radio and reconfigurable dynamic spectrum access in future.

A Software Defined Radio (SDR) technology is the most optimum approach to realize the support for the cognitive radio and dynamic spectrum access with a low cost.

When a vector processor is adopted to serve as basic hardware of the SDR technology to process a base-band physical layer signal, generally a scalar master control processor is needed to serve as hardware to run a high-layer protocol and control process. Since the master and slave processors need to pass a lot of parameters when implementing multimode, a conventional method, as shown in FIG. 1, is to pass all the parameters through a Mailbox mechanism formed by port registers or a dual-port Random Access Memory (RAM) at the periphery of the processor; in this way, a large number of port registers is consumed, and a chip area and power consumption of the processor are increased. Moreover, when the vector processor acquires a parameter, a cycle delay is needed in accessing the peripheral port; and thus parameter transmission efficiency is reduced.

SUMMARY

In view of the above, the main purpose of the disclosure is to provide a method and device for passing a parameter between processors, so as to solve the problem of high power consumption and low efficiency in passing a parameter between processors.

In order to achieve the purpose above, the technical scheme of the disclosure is realized as follows.

The disclosure provides a method for passing a parameter between processors, which includes:

in a source program of a slave processor, directly introducing a static configuration parameter to be passed;

obtaining a relative address of the static configuration parameter when converting the source program of the slave processor into a target program of the slave processor;

configuring directly, by a master processor, a parameter value of the static configuration parameter in the target program of the slave processor according to the obtained relative address of the static configuration parameter.

In the scheme above, the directly introducing the static configuration parameter to be passed may include: directly introducing the static configuration parameter to be passed in an immediate operand mode which can be identified by a compiling program.

In the scheme above, the obtaining the relative address of the static configuration parameter may include: converting the source program of the slave processor into the target program of the slave processor through a compiling program; scanning, by the compiling program, out various static configuration parameters from the source program of the slave processor; extracting the relative address of each static configuration parameter; and generating a configuration parameter address list containing the extracted relative address of each static configuration parameter.

In the scheme above, the method may further include: after obtaining the relative address of the static configuration parameter, storing the configuration parameter address list and the target program of the slave processor; wherein the configuring directly, by the master processor, the parameter value of the static configuration parameter in the target program of the slave processor according to the obtained relative address of the static configuration parameter comprises: searching, by the master processor, the stored configuration parameter address list for the relative address of the static configuration parameter currently to be passed, and configuring directly the parameter value of the static configuration parameter currently to be passed to an instruction in a corresponding position in the stored target program of the slave processor according to the searched relative address.

In the scheme above, the method may further include: when a parameter is to be exported, exporting, by the slave processor, the parameter to be passed to the master processor in a Direct Memory Access (DMA) mode.

In the scheme above, the exporting the parameter to be passed to the master processor in the DMA mode by the slave processor may include: exporting, by the slave processor, the parameter to be passed to a DMA memory through a DMA controller, and reading, by the master processor, the parameter to be passed from the DMA memory.

The disclosure also provides a system for passing a parameter between processors, which includes: a source program processing unit, a target program processing unit and a configuration unit, wherein the source program processing unit is configured to directly introduce a static configuration parameter to be passed in a source program of a slave processor;

the target program processing unit is configured to obtain a relative address of the static configuration parameter when converting the source program of the slave processor processed by the source program processing unit into a target program of the slave processor; and the configuration unit is configured to directly configure a parameter value of the static configuration parameter in the target program of the slave processor obtained by the target program processing unit according to the relative address of the static configuration parameter obtained by the target program processing unit.

In the scheme above, the target program processing unit may be further configured, when converting the source program of the slave processor processed by the source program processing unit into a target program of the slave processor through a compiling program, to scan out various static configuration parameters from the source program of the slave processor, to extract the relative address of each static configuration parameter, and to generate a configuration parameter address list containing the extracted relative address of each static configuration parameter.

In the scheme above, the system may further include: a memory unit, which is configured to store the configuration parameter address list generated by the target program processing unit and the target program of the slave processor obtained by the target program processing unit; and the configuration unit is further configured to search the memory unit for the relative address of the static configuration parameter currently to be passed, and to directly configure the parameter value of the static configuration parameter currently to be passed to an instruction in a corresponding position in the target program of the slave processor stored in the memory unit according to the searched relative address.

In the scheme above, the system may further include: an export unit, which is configured to export a parameter to be passed in the slave processor to the master processor in a Direct Memory Access (DMA) mode.

In the scheme above, the export unit may include: a DMA memory, a DMA controller and a reading module, wherein the DMA controller is configured to store the parameter to be passed in the slave processor to the DMA memory; the DMA memory is configured to store the parameter to be passed in the slave processor; and the reading module is configured to read the parameter to be passed from the DMA memory to the master processor.

With the method and the system provided by the disclosure for passing a parameter between processors, a static configuration parameter to be passed is directly introduced in a source program of a slave processor, so that a relative address of the static configuration parameter is obtained when a target program of the slave processor is obtained; before a master processor loads a program to the slave processor, the master processor can directly configure the parameter value of the static configuration parameter to the target program of the slave processor according to the obtained relative address of the static configuration parameter. In this way, the slave processor can directly obtain the parameter value of the static configuration parameter from an instruction decoding result; the transmission of static configuration parameter between master and slave processors can be implemented without external hardware such as a dual-port RAM or a register, thus, the number of dual-port RAM and register needed by parameter transmission between processors is reduced, the requirement of parameter transmission on external hardware is reduced, and the area and the static power consumption of a chip are reduced; moreover, the cycle delay of the slave processor in accessing the dual-port RAM and the register is reduced, and the dynamic power consumption of the chip is effectively reduced; in the condition that the main frequency keeps unchanged, the reduction of cycle in acquiring parameter enables the processor to accomplish more signal processing work within the same time, thereby improving the processing capability of the processor and enhancing the effective performance of the processor.

DETAILED DESCRIPTION

During an actual application, parameters needed to be passed between processors may include: a static configuration parameter and a dynamic interaction parameter. The disclosure mainly aims to pass the static configuration parameter between processors. The static configuration parameter has features as follows: the static configuration parameter is configured by a master processor before a slave processor is started; before the slave processor executes an instruction containing the static configuration parameter, the parameter value of the static configuration parameter can be determined and configured to the slave processor by the master processor; during a running process of the slave processor, the parameter value of the static configuration parameter does not need to be changed. The static configuration parameter may include register default value information of the slave processor, resource allocation information of a memory area and other parameters.

The basic idea of the disclosure is that: for passing a static parameter, a master processor can configure a parameter value of a static configuration parameter to a running program of a slave processor directly, without external hardware such as a dual-port RAM or a register; and thus the problem of high power consumption and low efficiency existing in parameter transmission between processors is resolved.

The disclosure adapts to the condition that a running program is loaded into a slave processor under the control of a master processor, here, the slave processor works in a Run to Stop mode.

Figure 1:
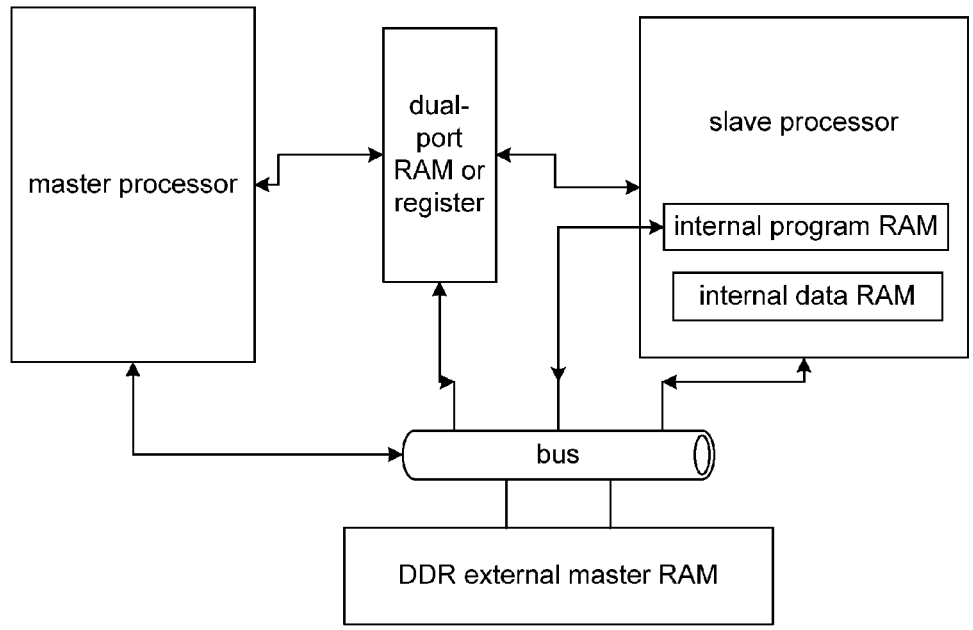
FIG. 1 shows a diagram of passing a parameter between processors in the related art.
Figure 2:
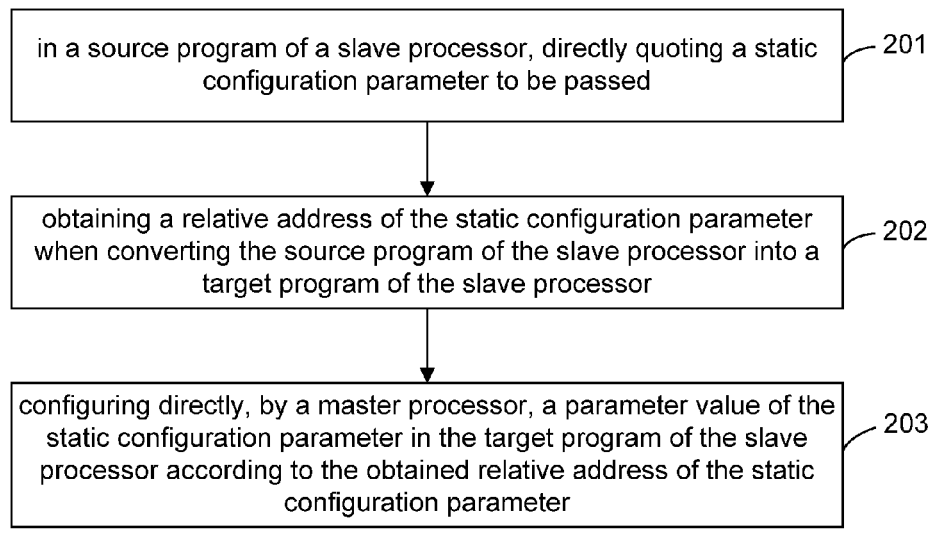
FIG. 2 shows a flowchart of a method for passing a parameter between processors according to the disclosure.

The method for passing a parameter between processors according to the disclosure, as shown in FIG. 2, mainly includes the following steps:

Step 201: in a source program of a slave processor, directly introducing a static configuration parameter to be passed.

Here, the static configuration parameter to be passed can be directly introduced in the source program of the slave processor by using an immediate operand mode which can be identified by a compiler.

Step 202: obtaining a relative address of the static configuration parameter when converting the source program of the slave processor into a target program of the slave processor.

Step 203: configuring directly, by a master processor, a parameter value of the static configuration parameter in the target program of the slave processor according to the obtained relative address of the static configuration parameter.

Specifically, when the source program of the slave processor is converted into the target program of the slave processor through a compiling program, various static configuration parameters can be scanned out from the source program of the slave processor, the relative address of each static configuration parameter can be extracted, and a configuration parameter address list containing the extracted relative address of each static configuration parameter can be generated.

Then, the generated configuration parameter address list and the target program of the slave processor are stored; before the master processor loads the target program to the slave processor, the master processor can search the stored configuration parameter address list for the relative address of the static configuration parameter currently to be passed, and directly configure the parameter value of the static configuration parameter currently to be passed to an instruction in a corresponding position in the stored target program of the slave processor according to the searched relative address of the static configuration parameter currently to be passed; in this way, the slave processor can obtain the parameter value of the static configuration parameter through instruction decoding while executing the corresponding instruction in the target program.

Here, the compiling program can be realized by a Personal Computer (PC) which can run a compiling program.

During an actual application, the generated configuration parameter address list and the target program of the slave processor can be stored in a memory, for example, a Double Data Rate (DDR) memory; before loading the target program to the slave processor, the master processor can search the memory for the relative address of the static configuration parameter, and can configure the parameter value of the static configuration parameter to the target program stored in the memory.

In addition, when a parameter is to be exported, the slave processor exports the parameter to be passed to the master processor in a Direct Memory Access (DMA) mode.

Specifically, the slave processor exports the parameter to be passed to a DMA memory through a DMA controller, and the master processor reads the parameter to be passed from the DMA memory.

Correspondingly, the disclosure also provides a system for passing a parameter between processors, which includes: a source program processing unit, a target program processing unit and a configuration unit; wherein the source program processing unit is configured to directly introduce a static configuration parameter to be passed in a source program of a slave processor; the target program processing unit is configured to obtain a relative address of the static configuration parameter when converting the source program of the slave processor processed by the source program processing unit into a target program of the slave processor; and the configuration unit is configured to directly configure a parameter value of the static configuration parameter in the target program of the slave processor obtained by the target program processing unit according to the relative address of the static configuration parameter obtained by the target program processing unit.

Specifically, the target program processing unit is further configured, when converting the source program of the slave processor processed by the source program processing unit into the target program of the slave processor through a compiling program, to scan out various static configuration parameters from the source program of the slave processor, to extract the relative address of each static configuration parameter, and to generate a configuration parameter address list containing the extracted relative address of each static configuration parameter.

Here, the system may further include: a memory unit, which is configured to store the configuration parameter address list generated by the target program processing unit and the target program of the slave processor obtained by the target program processing unit.

Specifically, the configuration unit is further configured to search the memory unit for the relative address of the static configuration parameter currently to be passed, and to directly configure the parameter value of the static configuration parameter currently to be passed to an instruction in a corresponding position in the target program of the slave processor stored in the memory unit according to the searched relative address of the static configuration parameter currently to be passed.

During an actual application, the memory unit specifically may be a memory with a memory function, for example, a DDR memory, or a Synchronous Dynamic Random Access Memory (SDRAM), or a Flash Memory, and the like.

In addition, the system may further include: an export unit, which is configured to export a parameter to be passed in the slave processor to the master processor in a DMA mode.

Specifically, the export unit may include: a DMA memory, a DMA controller and a reading module; wherein the DMA controller is configured to store the parameter to be passed in the slave processor to the DMA memory; the DMA memory is configured to store the parameter to be passed in the slave processor; and the reading module is configured to read the parameter to be passed from the DMA memory to the master processor.

During an actual application, a DMA memory space may be divided out in the above memory unit to serve as the DMA memory.

Specifically, in the above system, the source program processing unit may be set in the slave processor; the target program processing unit may be realized by a device capable of running a compiling program, for example, a PC equipped with a compiling program; the configuration unit may be set in the master processor; the memory unit is realized by a memory; the DMA memory may be realized by a DMA memory space divided out in the memory; and the reading module may be set in the master processor; wherein the DMA controller is connected with the master processor and the slave processor respectively, so as to pass the static configuration parameter between the master processor and the slave processor.

Embodiment 1

Figure 3:
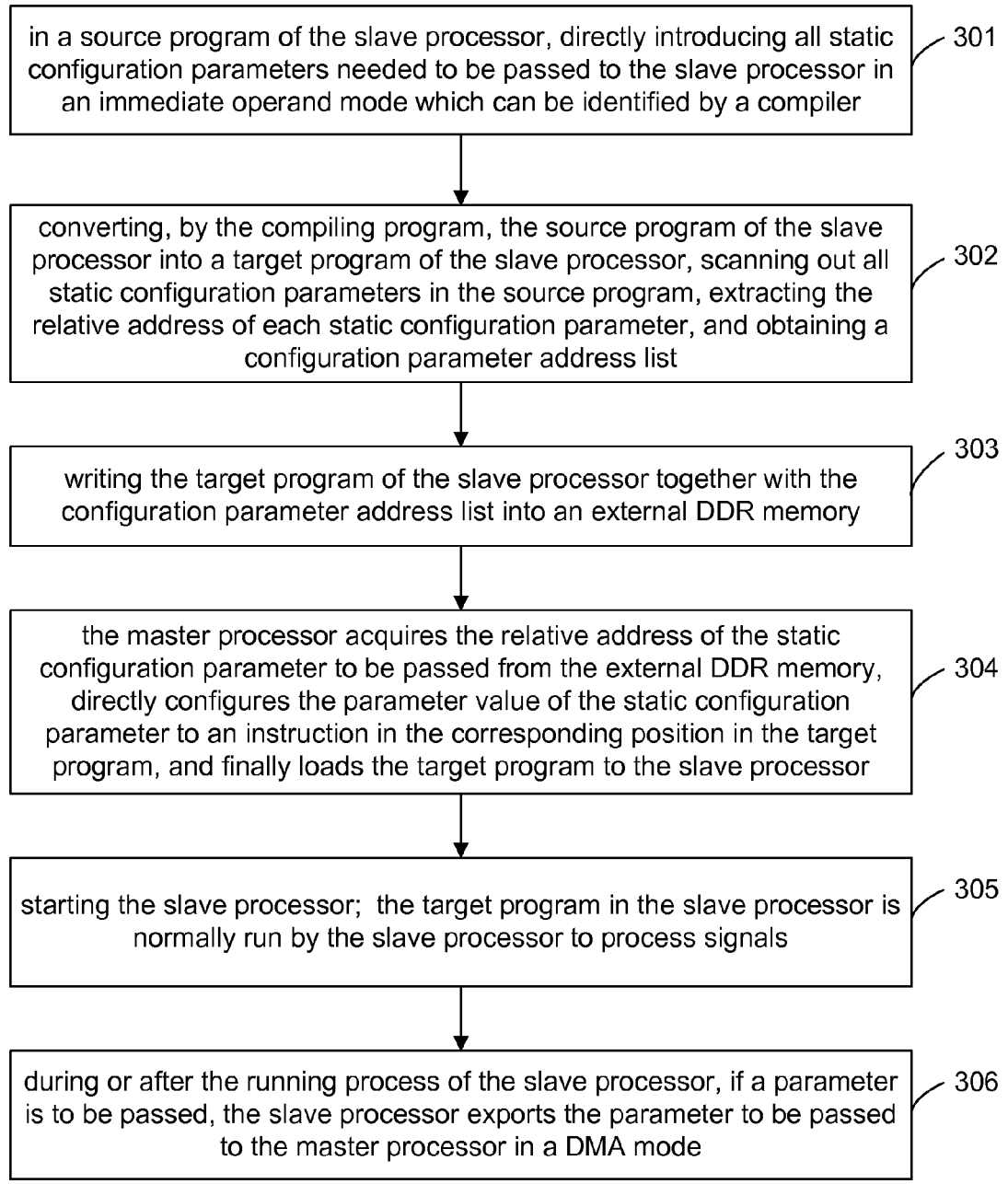
FIG. 3 shows a flowchart of a process for passing a parameter between a master processor and a slave processor in an embodiment of the disclosure.

During an actual application, a specific process of passing a parameter between a slave processor and a master processor, as shown in FIG. 3, mainly includes the following steps:

Step 301: in a source program of the slave processor, directly introducing all static configuration parameters needed to be passed to the slave processor in an immediate operand mode which can be identified by a compiler.

Here, the immediate operand mode which can be identified by the compiler specifically may be an immediate operand mode of macro definition, or a specific identification mode that can be identified by the compiler. For example, in the source program of the slave processor, the static configuration parameter may be directly introduced through the addition of prefix "SP_" to the parameter variable name of each static configuration parameter or the addition of other parameter variable name prefixes.

The static configuration parameter needed to be directly introduced may be determined through a predetermined way.

Step 302: converting, by the compiling program, the source program of the slave processor into a binary instruction program which can be run by the slave processor, that is, the target program of the slave processor; during this process, scanning, by the compiling program, out all static configuration parameters in the source program, extracting the relative address of each static configuration parameter, and obtaining a configuration parameter address list.

The configuration parameter address list contains the extracted relative address of each static configuration parameter.

Step 303: writing the target program of the slave processor together with the configuration parameter address list into an external DDR memory.

Figure 4:
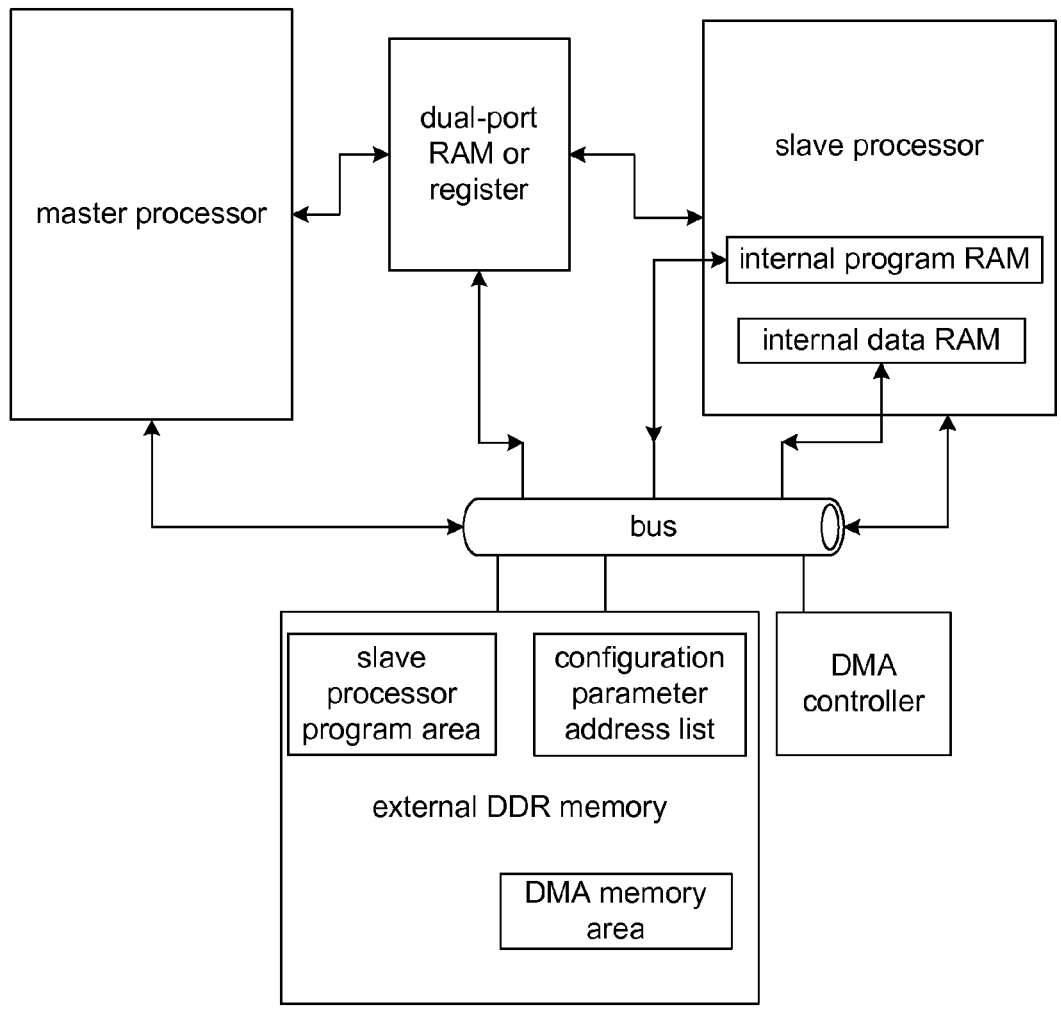
FIG. 4 shows a diagram of a process for passing a parameter between a master processor and a slave processor in an embodiment of the disclosure.

Specifically, as shown in FIG. 4, a slave processor program area and a configuration parameter address list area may be set in the external DDR memory. The target program of the slave processor is written into the slave processor program area in the external DDR memory, and the configuration parameter address list may be written into the configuration parameter address list area in the external DDR memory.

Here, other memories with a memory function, such as an SDRAM and a Flash memory, may also be used to replace the external DDR memory to store both the target program of the slave processor and the configuration parameter address list.

Step 304: before the master processor loads the target program to the slave processor, the master processor acquires the relative address of the static configuration parameter currently to be passed from the external DDR memory, directly configures the parameter value of the static configuration parameter to the instruction in the corresponding position in the target program according to the acquired relative address of the static configuration parameter, and finally loads the target program to the slave processor.

Specifically, as shown in FIG. 4, the master processor first searches the configuration parameter address list area in the external DDR memory for the relative address of the static configuration parameter currently to be passed, and modifies the immediate operand parameter part of the binary instruction in the corresponding position in the target program in the slave processor program area in the external DDR memory according to the relative address of the static configuration parameter, so as to configure the parameter value of the static configuration parameter in the instruction in the corresponding position in the target program.

For example, for a parameter pa, the process of passing a parameter value between a slave processor and a master processor is as follows: this parameter is directly applied in the source program of the slave processor, for example, an instruction inc SP_pa may be written in the source program and the parameter pa is applied directly; during converting the source program into a target program, the compiling program scans out the instruction inc SP_pa containing a prefix "SP" in the source program, scans out the parameter pa in the source program, extracts a relative address 0x00535 of the parameter pa and records it, and records content 0x01020666 of the instruction corresponding to the parameter pa after obtaining the target program; before loading the target program to the slave processor, the master processor needs to configure the value of the parameter pa to be 777; then the master processor searches for the relative address 0x00535 of the parameter pa and replaces the content 0x01020666 of the instruction corresponding to the parameter pa with 0x01020777, and writes the new content into the memory space in the target program with the relative address of 0x00535, thereby modifying the value of the parameter pa from 666 into 777.

Step 305: starting the slave processor; the target program in the slave processor is normally run by the slave processor to process signals.

Step 306: during or after the running process of the slave processor, if a parameter is to be passed, the slave processor exports the parameter to be passed to the master processor in a DMA mode.

During an actual application, when the slave processor needs to report its state information to the master processor during the running process or when the slave processor needs to return a calculation result after the running process, a parameter is needed to be passed; generally, the parameter to be passed is a static configuration parameter, for example, information about a currently hosted mobile serving cell, or wireless channel state information.

Specifically, the slave processor passes the data in the internal data area in the slave processor to the master processor in a DMA mode. As shown in FIG. 4, the slave processor includes two areas, namely, internal program RAM and internal data RAM areas, wherein the internal program RAM area stores a program needed when the slave processor is running, and the master processor may load the target program of the slave processor to the internal program RAM area; the internal data RAM area stores both a parameter needed when the slave processor is running and data generated during the running process; and the parameter to be passed is stored in the internal data RAM area; when a parameter is to be exported, the slave processor exports the parameter from the internal data RAM area in a DMA mode.

Here, the process of passing a parameter in a DMA mode may include: as shown in FIG. 4, a DMA controller may be added in a device used for passing a parameter, and a DMA memory space may be set in the external DDR memory; the slave processor configures the source address and the destination address of the DMA controller, configures the length of DMA transmission, and starts the DMA transport process; then, the DMA controller transports the parameter to be passed from the internal data RAM area of the slave processor to the DMA memory space in the external DDR memory; then, the master processor reads the parameter from the DMA memory space in the external DDR memory. Here, the destination address of the DMA controller may be the address of the DMA memory space in the external DDR memory, and the source address may be the address of the internal data RAM area of the slave processor; and the length of transmission may be determined according to the parameter to be passed.

In addition, in this embodiment, as shown in FIG. 4, the master processor and the slave processor may pass dynamic interaction parameters there-between through a dual-port RAM or a register; wherein the master processor, the slave processor, the dual-port RAM and the register, the DMA controller and the external DDR memory are connected through a bus.

The above are preferred embodiments of the disclosure and are not intended to limit the scope of protection of the disclosure.

The invention claimed is:
1. A method for passing a parameter between processors, comprising:
    in a source program of a slave processor, directly introducing a static configuration parameter to be passed;
    obtaining a relative address of the static configuration parameter when converting the source program of the slave processor into a target program of the slave processor;
    configuring directly, by a master processor, a parameter value of the static configuration parameter in the target program of the slave processor according to the obtained relative address of the static configuration parameter,
    wherein the obtaining the relative address of the static configuration parameter comprises:
    converting the source program of the slave processor into the target program of the slave processor through a compiling program; scanning, by the compiling program, out various static configuration parameters from the source program of the slave processor; extracting the relative address of each static configuration parameter;

and generating a configuration parameter address list containing the extracted relative address of each static configuration parameter.

2. The method for passing a parameter between processors according to claim 1, wherein the directly introducing the static configuration parameter to be passed comprises:
   directly introducing the static configuration parameter to be passed in an immediate operand mode which can be identified by a compiling program.

3. The method for passing a parameter between processors according to claim 2, further comprising:
   when a parameter is to be exported, exporting, by the slave processor, the parameter to be passed to the master processor in a Direct Memory Access (DMA) mode.

4. The method for passing a parameter between processors according to claim 1, further comprising: after obtaining the relative address of the static configuration parameter, storing the configuration parameter address list and the target program of the slave processor;
   the configuring directly, by the master processor, the parameter value of the static configuration parameter in the target program of the slave processor according to the obtained relative address of the static configuration parameter comprises: searching, by the master processor, the stored configuration parameter address list for the relative address of the static configuration parameter currently to be passed, and configuring directly the parameter value of the static configuration parameter currently to be passed to an instruction in a corresponding position in the stored target program of the slave processor according to the searched relative address.

5. The method for passing a parameter between processors according to claim 4, further comprising:
   when a parameter is to be exported, exporting, by the slave processor, the parameter to be passed to the master processor in a Direct Memory Access (DMA) mode.

6. The method for passing a parameter between processors according to claim 1, further comprising:
   when a parameter is to be exported, exporting, by the slave processor, the parameter to be passed to the master processor in a Direct Memory Access (DMA) mode.

7. A system for passing a parameter between processors, comprising: a master processor, a slave processor, and a Personal Computer (PC) equipped with a compiling program, wherein
   the slave processor is configured to directly introduce a static configuration parameter to be passed in a source program of the slave processor;
   the PC is configured to obtain a relative address of the static configuration parameter when converting the source program of the slave processor processed by the slave processor into a target program of the slave processor; and
   the master processor is configured to directly configure a parameter value of the static configuration parameter in the target program of the slave processor obtained by the PC according to the relative address of the static configuration parameter obtained by the PC,
   wherein the PC is further configured, when converting the source program of the slave processor processed by the slave processor into a target program of the slave processor through a compiling program, to scan out various static configuration parameters from the source program of the slave processor, to extract the relative address of each static configuration parameter, and to generate a configuration parameter address list containing the extracted relative address of each static configuration parameter.

8. The system for passing a parameter between processors according to claim 7, further comprising: a memory, which is configured to store the configuration parameter address list generated by the PC and the target program of the slave processor obtained by the PC; and
   the master processor is further configured to search the memory for the relative address of the static configuration parameter currently to be passed, and to directly configure the parameter value of the static configuration parameter currently to be passed to an instruction in a corresponding position in the target program of the slave processor stored in the memory according to the searched relative address.

9. The system for passing a parameter between processors according to claim 8, the slave processor is further configured to export a parameter to be passed in the slave processor to the master processor in a Direct Memory Access (DMA) mode.

10. The system for passing a parameter between processors according to claim 9, wherein the slave processor is further configured to store the parameter to be passed in the slave processor to a DMA memory; and
    the master processor is further configured to read the parameter to be passed from the DMA memory.

11. The system for passing a parameter between processors according to claim 7, the slave processor is further configured to export a parameter to be passed in the slave processor to the master processor in a Direct Memory Access (DMA) mode.

12. The system for passing a parameter between processors according to claim 11, wherein the slave processor is further configured to store the parameter to be passed in the slave processor to a DMA memory; and
    the master processor is further configured to read the parameter to be passed from the DMA memory.

* * * * *